United States Patent [19]

Pregaglia et al.

[11] 3,716,562
[45] Feb. 13, 1973

[54] PROCESS FOR PREPARING OLEFIN OXIDES

[75] Inventors: Gianfranco Pregaglia; Giorgio Montorsi; Giuseppe Caprara, all of Milan; Giuseppe Messina, Alghero, all of Italy

[73] Assignee: Montecatini Edison S.p.A., Milan, Italy

[22] Filed: June 10, 1971

[21] Appl. No.: 151,979

[30] Foreign Application Priority Data

June 12, 1970 Italy..............................25901 A/70

[52] U.S. Cl. ..........................................260/348.5 V
[51] Int. Cl. ................................................C07d 1/06
[58] Field of Search................................260/348.5 V

[56] References Cited

FOREIGN PATENTS OR APPLICATIONS 1,293,142   4/1969   Germany

*Primary Examiner*—Norma S. Milestone
*Attorney*—Stevens, Davis, Miller & Mosher

[57] ABSTRACT

Olefin oxides are prepared with greatly improved yield in the liquid phase reaction of olefins, aldehydes, the carbonyl group of which is bound to tertiary or secondary carbon atom, by conducting the process in two stages. In the first stage the gas containing oxygen is reacted in the liquid phase with the olefin and aldehyde at a temperature of 0°–120° C., wherein the olefin/aldehyde molar ratio is between 50 : 1 and 1 : 1, until at least 35 percent conversion of the aldehyde. In the second stage in which the oxygen feed is preferably interrupted, the reaction is continued at a temperature of 50°–150° C. in the presence of a catalyst selected from the group consisting of compounds of molybdenum, titanium, tungsten, vanadium and combinations thereof.

10 Claims, No Drawings

PROCESS FOR PREPARING OLEFIN OXIDES

The present invention relates to a process for preparing olefin oxides by reaction in the liquid phase, at temperatures ranging from 0° to 150° C., of olefins having at least three carbon atoms with an aliphatic, a cycloaliphatic or an aralkylic aldehyde having at least four carbon atoms, whose carbonyl group is bound to a tertiary or secondary carbon atom.

Processes of this type are already known, but the oxide yields obtainable (with respect to the aldehyde utilized) are not satisfactory; specifically, the maximum theoretical oxide quantity obtainable according to said processes is 1 mole per mole of converted aldehyde and, in practice, the yields are far below that amount.

One object of the present invention is therefore the attainment of higher oxide yields with respect to the aldehyde employed in the above-mentioned processes. Further objects will appear from the description given hereinafter.

It has now surprisingly been found that higher oxide yields, with respect to the aldehyde employed in the aforesaid processes, can be reached according to a process comprising:

a. a first stage, in which a gas containing oxygen is made to react in the liquid phase with an olefin having at least three carbon atoms and with an aliphatic, a cycloaliphatic or an aralkylic aldehyde having at least four carbon atoms, whose carbonyl group is bound to a tertiary or secondary carbon atom, at temperatures ranging from 0° C. to 120° C., wherein the olefin/aldehyde molar ratios are between 50 : 1 and 1 : 1, until there is obtained an aldehyde conversion of at least 35 percent; and b. a second stage, in which the addition of the aforesaid gas containing oxygen is preferably interrupted, while the reaction is made to continue at temperatures ranging from 50° C. to 150° C. in the presence of suitable catalysts, the nature of which are hereinafter described.

In fact, it has surprisingly been ascertained that, according to the process just described, the yields can rise to over 1 mole of oxide per mole of converted aldehyde. The process according to the present invention is deemed to be based on the following theoretical equation:

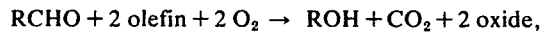

$$RCHO + 2 \text{ olefin} + 2 O_2 \rightarrow ROH + CO_2 + 2 \text{ oxide},$$

wherein R is an aliphatic, a cycloaliphatic or an aralkylic tertiary or secondary radical.

The olefin may be fed either all at once at the beginning of the process, or in two portions, one at the beginning of the process and the other contemporaneously with the addition of the catalyst.

The catalyst is preferably selected from the compounds of titanium, molybdenum, tungsten, vanadium and their combinations. In particular, advantageous results are attained by using molybdenum hexacarbonyl and, more generally, the organic and metallorganic derivatives of the above-mentioned elements. The catalyst quantity is suitably comprised between 0.05 and 50 millimoles per mole of aldehyde. The first reaction stage may be started by the typical initiators of radical oxidations such as peroxides, peresters and the like, but it occurs at satisfactory rates also without such initiators.

Air or oxygen-nitrogen mixtures having $O_2/N_2$ ratios different from the air composition may be used as oxidizing gas; other inert gases such as $CO_2$, noble gases, combinations of same and the like may be present as well.

The process occurs at a pressure sufficient to maintain the liquid phase, usually comprised between 1 and 100 kg/cm² abs., and preferably between 1 and 50 kg/cm² abs.

The reaction is preferably conducted in the presence of an inert diluent, which is useful also for the purpose of removing the heat. As diluents, there are mentioned, for instance, the lower aliphatic alcohols, ethyl acetate, diacetate of propylene glycol and other homologous esters, monochlorobenzene and dichlorobenzene, benzonitrile, benzene, toluene and the secondary reaction products themselves which have been recycled after rectification. Generally speaking, it is preferable to employ more than 1 mole of diluent per mole of aldehyde.

The aldehydes preferred according to the present invention belong to the aliphatic, cycloaliphatic and aralkylic classes. Conversely, the aldehydes whose carbonyl group is directly bound to an aromatic nucleus lead to unsatisfactory results. Some types of said aldehydes, such as isobutyric, pivalic, hexahydrobenzoic and 2-ethyl-hexanoic aldehyde, have given particularly excellent results.

The olefins preferred for the industrial application of the present invention are those having from three to 18 carbon atoms, optionally substituted by groups which remain inert under the reaction conditions; halogens, alkoxy groups, carboxyl groups, carboalkoxy groups, combinations of same and the like may be cited as examples of such groups. Olefins such as propylene, 2-butene, butadiene, isoprene, 1-octene, 2-octene, propylene trimers and tetramers, 1-decene, 1-tetradecene, 1-hexadecene, their mixtures and the like have proved particularly suitable for the purposes of the present invention. The olefin/aldehyde molar ratio is preferably kept between 16 : 1 and 2 : 1, and the oxygen/aldehyde molar ratio between 10 : 1 and 0.1 : 1.

The residence time of the reagents in the reaction equipment in both the first and the second stage is usually comprised between 1 minute and 10 hours, depending upon the operating conditions; it is advisable to keep said period of time between 10 minutes and 3 hours. The operation can be conducted continuously, discontinuously or semicontinuously; if the first stage operation occurs continuously, the oxidizing gas can flow in cocurrent or in countercurrent with the liquid phase. On reaction completion, the products are separated by distillation, and the by-products are partially suitably recycled to the reaction zone.

The olefin oxides prepared according to the present invention are profitably utilizable in the production of the optionally substituted glycols and polyglycols and, consequently, in the field of surfactants in general and of synthetic detergents in particular. Another utilization of the oxides obtained according to the present invention and, particularly, of the propylene oxide, is the preparation of polyethers for polyurethane foams. The reaction by-products consist mostly of alcohols, which may be utilized, for instance, as solvents; if the employed aldehyde is isobutyric aldehyde, then the by-product consists predominantly of isopropyl alcohol.

The following examples are presented to illustrate the present invention, without being however a limitation thereof.

EXAMPLES 1-6

The aldehyde, the olefin and 0.1 millimoles of ditertiarybutyl-peroxalate are introduced into a 50 cc. tubular glass microreactor made and connected with an oxygen tank; the temperature is then adjusted to the desired value, and the oxygen is continuously fed in order to keep the pressure constant at about 200 mm. Hg. over the atmospheric pressure. At the end of the first reaction stage lasting a predetermined time, the product mixture is added, after a chromatographic analysis, with an equal volume of toluene solution of hexacarbonyl molybdenum. The temperature is adjusted to 90° C. and the reaction is carried on without any further addition of oxygen for a 3-hour period. The results of the chromatographic analysis of the final product are reported in Table I, together with the results of the analysis carried out at the end of the first reaction stage.

EXAMPLE 7

(Comparison Example)

Example 3 was repeated, but the catalyst was added at the beginning of the first stage; the aldehyde conversion at the end of the first stage was 40 percent, and the oxide quantity 49 percent with respect to the converted aldehyde. At the end of the second stage the converted aldehyde quantity remained unchanged, while the oxide quantity amounted to 57 percent with respect to the converted aldehyde. This fact clearly proves the advantage deriving from adding the catalyst only in the second stage. For clarity, the results of the comparison test No. 7 are reported in Table I with Examples 1-6.

isobutene are introduced into a 1 liter autoclave made of stainless steel, provided with a magnetic stirrer and an inner coil for the temperature control. The solution is heated to 95° C. and the pressure is made to rise at first to 25 kg/cm$^2$ by pumping of nitrogen and then to 40 kg/cm$^2$ by pumping of oxygen. Sixty cc. (0.66 moles) of isobutyric aldehyde are fed in a period of 60 minutes by a proportioning pump, while the pressure drops are contemporaneously made up for with oxygen. The aldehyde conversion amounts to 85% and the isobutene oxide formed amounts to 52 mole percent of the converted aldehyde. Now, 0.1 g. of molybdenum hexacarbonyl dissolved in a few cc. of diluent are injected and the reaction is conducted at 95° C. for 3 hours without any oxygen addition. Though the aldehyde conversion remains constant, the oxide quantity formed increases till reaching 70 percent with respect to the converted aldehyde. If the second reaction stage occurs without addition of catalyst, no increase in the oxide quantity can be noticed. The analyses of the products have been carried out according to the chromatographic method.

What is claimed is:

1. A process for preparing olefin oxides by the co-oxidation, in the liquid phase, and at temperatures ranging from 0° to 150° C, of olefins having at least three carbon atoms and an aliphatic, cycloaliphatic or aralkylic aldehyde having at least four carbon atoms, whose carbonyl group is bound to a tertiary or secondary carbon atom, with a gas containing oxygen, said process comprising:

a. a first stage, in which a gas containing oxygen is reacted with an olefin having at least three carbon atoms and with an aliphatic, cycloaliphatic or aralkylic aldehyde having at least four carbon atoms, whose carbonyl group is bound to a tertiary or secondary carbon atom, at temperatures ranging

TABLE I

| Example | Olefin (millimoles) | 1st stage T(° C.) | 1st stage Time | Mo(CO)$_6$, mg. | Aldehyde (millimoles) | Converted aldehyde 1st stage, percent | Converted aldehyde Final stage, percent | Oxide++ 1st stage, percent | Oxide++ Final stage, percent |
|---|---|---|---|---|---|---|---|---|---|
| 1 | 2-octene (76.8) | 20 | 5 hours | 30 | Isobutyric (20.9) | 50 | 50 | 64 | 96 |
| 2 | 2-octene (76.8) | 50 | 4 hours | 30 | Isobutyric (21.2) | 60 | 60 | 81 | 143 |
| 3 | 2-octene (79.0) | 20 | 90 mins | 24 | Pivalic (10.5) | 59 | 59 | 69 | 104 |
| 4 | 2-octene (78.7) | 20 | 45 mins | 20 | Pivalic (21.2) | 48 | 48 | 58 | 82 |
| 5 | 2-octene (77.5) | 50 | 90 mins | 25 | Hexahydrobenzoic (10.7) | 58 | 58 | 76 | 126 |
| 6 | Propylene trimer (71.2) | 50 | 60 mins | 21 | Isobutyric (21.5) | 43 | 43 | 63 | 90 |
| 7 | 2-octene (79.0) | 20 | 90 mins | 24 | Pivalic (10.5) | 40 | 40 | 49 | 57 |

NOTE.—++With respect to the converted aldehyde (mole percent).

From Table I and in particular from Examples 2, 3 and 5, one will notice that the oxide yield exceeds by far 100 percent (molar) with respect to the converted aldehyde. Also, the temperature of the first stage affects the course of the reaction, and the same may be said for the olefin/aldehyde molar ratio. All the examples have invariably proved that when the addition of molybdenum hexacarbonyl was omitted in the second reaction stage, no increase in the epoxide quantity occurred.

EXAMPLE 8

Two-hundred and fifty grams of diacetate of propylene glycol as diluent and 160 g. (2.85 moles) of from 0° to 120° C., wherein the olefin/aldehyde molar ratios are between 50:1 and 1:1, until at least 35 percent of the aldehyde is converted, and b. a second stage, in which the feed of the aforesaid gas containing oxygen is interrupted, while the reaction is continued at temperatures ranging from 50° to 150° C. in the presence of a molybdenum compound.

2. A process according to claim 1, wherein said aldehyde is isobutyric aldehyde.

3. A process according to claim 1, wherein said aldehyde is pivalic aldehyde.

4. A process according to claim 1, wherein said aldehyde is hexahydrobenzoic aldehyde.

5. A process according to claim 1, wherein said aldehyde is 2-ethyl-hexanoic aldehyde.

6. A process according to claim 1, wherein said olefins are olefins having from three to 18 carbon atoms.

7. A process according to claim 6, wherein said olefin is propylene.

8. A process according to claim 6, wherein said olefin is isobutene.

9. A process according to claim 6, wherein said olefin is 2-octene.

10. A process according to claim 6, wherein said olefin is selected from the group consisting of propylene trimers, tetramers and their mixtures.

* * * * *